C. H. NORTON.
REVERSING MECHANISM.
APPLICATION FILED MAY 21, 1917.
1,261,158.
Patented Apr. 2, 1918.
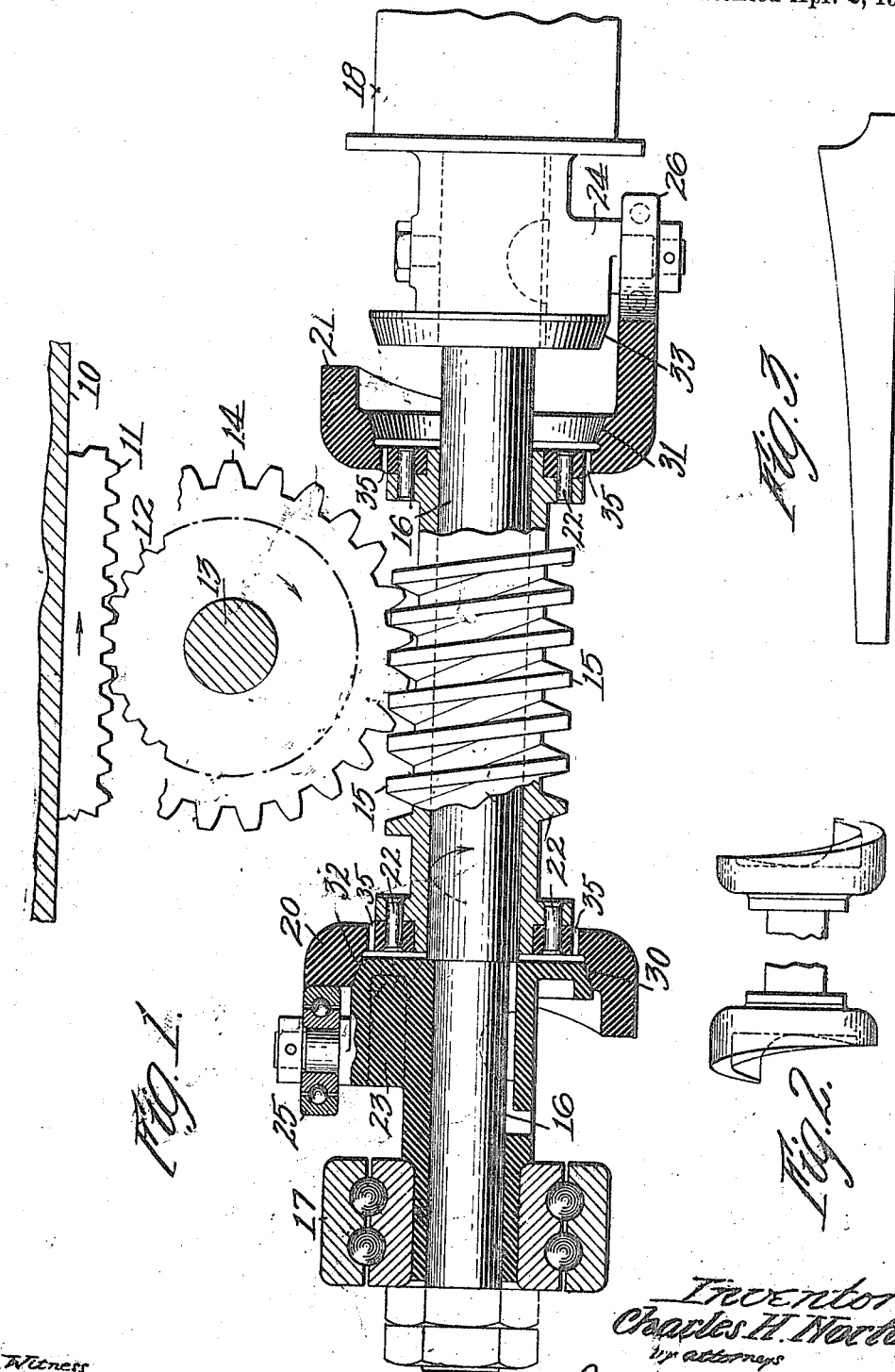

UNITED STATES PATENT OFFICE.

CHARLES H. NORTON, OF WORCESTER, MASSACHUSETTS, ASSIGNOR TO NORTON GRINDING COMPANY, OF WORCESTER, MASSACHUSETTS, A CORPORATION OF MASSACHUSETTS.

REVERSING MECHANISM.

1,261,158.  Specification of Letters Patent.  Patented Apr. 2, 1918.

Application filed May 21, 1917. Serial No. 169,858.

*To all whom it may concern:*

Be it known that I, CHARLES H. NORTON, a citizen of the United States, residing at Worcester, in the county of Worcester and State of Massachusetts, have invented a new and useful Reversing Mechanism, of which the following is a specification.

This invention relates to a reversing mechanism of the type shown in my prior Patent No. 1,191,987 issued to me July 25, 1916.

In this type of mechanism, which is particularly designed for reversing a worm and worm wheel drive, there is provided a driving shaft alternately rotated in opposite directions, a worm axially and angularly movable on said shaft, a worm wheel meshing with said worm, and driving connections between the shaft and the worm effective to move the worm axially on the driving shaft after each reversal of rotation of said shaft, and at the same time to permit limited relative angular movement between said shaft and worm.

In my prior patent this angular movement was limited by the abrupt contact of the roller with a projection on the cam. Thus the inertia of the worm was overcome instantly, resulting in objectionable noise.

It is the principal object of my present invention to provide cushioned connections between the worm and its driving shaft, said connections being brought into operative relation as the worm completes its axial movement in either direction. These connections are partially submerged in oil and the cushioning effect results from trapping a portion of the oil between the approaching surfaces of a conical clutch forming a part of said connections, and then forcing the oil out gradually through one or more escape openings of suitable size. The oil is forced out by the axial movement of the worm, caused by the action of one of the cam rolls upon the corresponding side cam. While I prefer to use conical surfaces, I do not wish to be limited to this form as I may use any two surfaces between which oil may be trapped and in connection with which escape means can be provided to bring about the desired cushioning effect.

In the operation of the mechanism a large amount of oil is splashed up between the two members of the clutch, thus allowing sufficient oil to be trapped to cause a very gradual cushioning effect. The degree of cushioning effect can be permanently adjusted as desired by drilling one or more oil escape holes of such size as conditions require.

Another object of my invention is to provide a novel oiling device by means of which the worm is sprayed with a jet of oil at each reversal of the driving shaft.

My invention also relates to certain arrangements and combinations of parts which will be hereinafter described and more particularly pointed out in the appended claims.

A preferred form of my invention is shown in the drawings, in which—

Figure 1 is a sectional elevation taken substantially along the axis of the driving shaft;

Fig. 2 is a side elevation of the cams which shift the worm axially, and

Fig. 3 is a development of one of the cams.

The work table is indicated at 10 and is provided with a rack 11 meshing with a pinion 12 fixed to a shaft 13 driven by a worm wheel 14. The worm wheel 14 meshes with a worm 15 mounted upon a driving shaft 16 supported in fixed bearings 17 and 18. One or both of these bearings may be of a ball-bearing type designed to resist axial thrust on the driving shaft.

The shaft 16 is connected to suitable driving mechanism (not shown) through which it is positively rotated alternately in opposite directions, the reversal of motion being preferably automatic. The worm 15 is loosely mounted upon the shaft 16 and is free to move both axially and angularly thereon. Side cams 20 and 21 are rigidly secured to the worm 15 at each end thereof, being fastened thereto in any convenient manner as by rivets 22. The outline of the cam surface of one of these members is clearly shown in the development thereof in Fig. 3. While the precise outline shown in the drawing is not essential to my invention, it is preferable that the angle of the cam surface should gradually increase, for reasons to be explained.

Driving arms 23 and 24 are fixed to the shaft 16 and support cam rolls 25 and 26, herein shown as mounted upon anti-friction bearings. The arms 23 and 24 are so spaced upon the shaft 16 that the rolls 25 and 26 are substantially in engagement with the cams 20 and 21 at all times.

The parts thus far described are substantially the same as those shown in my prior patent, to which reference is made for a more complete description thereof.

In my prior construction, the driving connection between the worm 15 and the shaft 16 was entirely through the cams and cam rolls above described. As above stated, it is the principal object of my present invention to provide supplementary cushioning connections through the action of which the inertia of the worm may be gradually overcome and the metallic noise caused by abrupt engagement of the roll and cam may be eliminated.

In the form shown in the drawings the cams 20 and 21 are provided with concave conical surfaces 30 and 31 adapted to engage coöperating convex members 32 and 33 formed on the driving arms 23 and 24. I also provide each cam 20 and 21 with oil holes 35 extending through the web thereof.

The operation of my improved reversing mechanism is as follows:

Let it be assumed that the parts are in the position shown in Fig. 1 with the driving shaft 16 rotating in the direction of the arrow a in said figure. The worm 15 will be rotated in the same direction through the combined driving engagement of the clutch members 30 and 32 and the cam 21 and cam roll 26, the cam roll tending constantly to force the clutch members into closer engagement. If the shaft 16 is now reversed the roll 26 will move backward relatively to the cam 21 and will no longer have driving connection therewith. At the same time the roll 25 will move forward along the incline of the cam 20, forcing the worm 15 axially along the shaft 16 with a gradually accelerating motion. At this time, however, the worm will be without angular motion. As the worm wheel 14 is thus moved with gradually increasing velocity by the axial movement of the worm 15, the clutch member 31 gradually approaches the clutch member 33. As the worm wheel 14 attains substantially its normal speed of revolution the members 31 and 33 are adjacent each other and the roll 25 tends constantly to force them into closer engagement. Their approach is controlled by the escape of oil from between the conical surfaces, the rate of escape being determined by the size and number of the oil holes. After said surfaces are fully engaged, the worm revolves with the shaft until the mechanism is again reversed.

For a more complete analysis of the details of operation during reversal, reference is again made to my prior patent above identified.

The apparatus is designed to run in oil and inspection of the drawings will show that a considerable quantity of oil will be trapped between the clutch members at each reversal of the driving shaft. As the clutch members come into driving engagement the trapped oil is ejected forcibly through the oil holes 35, from which it is delivered in the form of jets upon the surface of the worm 15. All parts of the apparatus are thus effectively oiled during the continued operation of the mechanism.

Having thus described my invention, it will be evident that changes and modifications can be made therein by those skilled in the art without departing from the spirit and scope thereof as set forth in the claims, and I do not wish to be otherwise limited to the details herein disclosed, but what I claim is—

1. A reversing mechanism having, in combination, a driving shaft, rotatable alternately in opposite directions, a worm mounted on said shaft and movable both angularly and axially relatively to said shaft, a worm wheel meshing with said worm, means to move said worm bodily endwise upon reversal of said shaft thereby imparting a movement of rotation in the reverse direction to said worm wheel and to thereafter positively rotate said worm with said shaft, and cushioning connections between said shaft and said worm.

2. A reversing mechanism having, in combination, a driving shaft, rotatable alternately in opposite directions, a worm mounted on said shaft and movable both angularly and axially relatively to said shaft, a worm wheel meshing with said worm, means to move said worm bodily endwise upon reversal of said shaft thereby imparting a movement of rotation in the reverse direction to said worm wheel and to thereafter positively rotate said worm with said shaft, and two separate sets of cushioning connections between said shaft and said worm, one set of said connections becoming operative after each reversal of the driving shaft.

3. A reversing mechanism having, in combination, a driving shaft, rotatable alternately in opposite directions, a worm mounted on said shaft and movable both angularly and axially relatively to said shaft, a worm wheel meshing with said worm, means to move said worm bodily endwise upon reversal of said shaft, thereby imparting a movement of rotation in the reverse direction to said worm wheel, and means to thereafter positively rotate said worm, said means including cushioning clutch members, one of said members being fast with said shaft and the other member having driving connection with said worm.

4. A reversing mechanism having, in combination, a driving shaft, rotatable alternately in opposite directions, a worm mounted on said shaft and movable both angularly and axially relatively to said shaft, a worm wheel meshing with said worm, and driving connections between said shaft and said worm, said connections comprising cushioning clutch members fixed to both ends of said worm, coöperating clutch members fast with said shaft and spaced apart thereon, and means to move said worm axially and angularly relatively to said shaft to alternately engage the clutch members at opposite ends of said worm.

5. A reversing mechanism having, in combination, a driving shaft, rotatable alternately in opposite directions, a worm mounted on said shaft and movable both angularly and axially relatively to said shaft, a worm wheel meshing with said worm, and driving connections between said shaft and said worm, said connections comprising a cushioning cone clutch member fixed to each end of said worm, coöperating cone clutch members fast to the shaft and spaced apart thereon, and means to move said worm axially at each reversal of said shaft to alternately render the cushioning clutch members operative at opposite ends of said worm.

6. A reversing mechanism having, in combination, a driving shaft, rotatable alternately in opposite directions, a worm mounted on said shaft and movable both angularly and axially relatively to said shaft, a worm wheel meshing with said worm, and driving connections between said shaft and said worm effective to rotate said worm wheel by direct axial movement of said worm at the beginning of each reverse movement of said worm wheel and to thereafter continue said rotation in the same direction by positive rotation of said worm, said connections including coöperating cushioning clutch members fast to said worm and shaft respectively and brought into successive operative engagement by the alternate axial movements of said worm relatively to said shaft.

7. A reversing mechanism having, in combination, a driving shaft, rotatable alternately in opposite directions, a worm mounted on said shaft and movable both angularly and axially relatively to said shaft, a worm wheel meshing with said worm, and driving connections between said shaft and said worm, said connections comprising reversely disposed cam disks secured to the opposite ends of said worm, a pair of driving arms fixed to said shaft and each positioned to coöperate with one of said cam disks for moving said worm axially, and cushioning members secured to said disks and said driving arms respectively, said clutch members coöperating with said cam disks and driving arms to positively connect said worm with said shaft.

8. A reversing mechanism having, in combination, a driving shaft, rotatable alternately in opposite directions, a worm mounted on said shaft and movable both angularly and axially relatively to said shaft, a worm wheel meshing with said worm, and driving connections between said shaft and said worm, said connections comprising a concave cone clutch member fixed to each end of said worm and having an oil hole therein, coöperating convex cone clutch members fixed to said shaft and spaced apart thereon, and means to move said worm axially to alternately engage said clutch members, each convex clutch member acting as a piston to force oil through the oil hole in its coöperating concave member onto the threaded surface of said worm.

In testimony whereof I have hereunto affixed my signature.

CHARLES H. NORTON.